(12) United States Patent
Walker et al.

(10) Patent No.: US 8,571,570 B2
(45) Date of Patent: Oct. 29, 2013

(54) METHODS AND APPARATUS FOR DELIVERING REGIONAL PARAMETERS

(75) Inventors: Gordon Kent Walker, Poway, CA (US); Bruce Collins, San Diego, CA (US); Carlos Marcelo Dias Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1449 days.

(21) Appl. No.: 11/270,210

(22) Filed: Nov. 8, 2005

(65) Prior Publication Data

US 2007/0117536 A1 May 24, 2007

(51) Int. Cl.
H04W 64/00 (2009.01)

(52) U.S. Cl.
USPC .................................. 455/456.1; 455/456.3

(58) Field of Classification Search
USPC ............. 455/456.3, 404.2, 405, 550.1, 456.1, 455/456.2, 456.6, 67.12; 370/456.3
See application file for complete search history.

(56) References Cited

U.S. PATENT DOCUMENTS

| | | |
|---|---|---|
| 4,600,921 A | 7/1986 | Thomas |
| 5,491,774 A | 2/1996 | Norris et al. |
| 5,604,528 A | 2/1997 | Edwards et al. |
| 5,652,759 A | 7/1997 | Stringfello, Jr. |
| 5,659,350 A | 8/1997 | Hendricks et al. |
| 5,696,500 A | 12/1997 | Diem |
| 5,717,923 A | 2/1998 | Dedrick |
| 5,805,763 A | 9/1998 | Lawler et al. |
| 5,978,649 A | 11/1999 | Kahn |
| 6,016,141 A | 1/2000 | Knudson et al. |
| 6,075,526 A | 6/2000 | Rothmuller |
| 6,088,722 A | 7/2000 | Herz et al. |
| 6,122,658 A | 9/2000 | Chaddha |
| 6,230,203 B1 | 5/2001 | Koperda et al. |
| 6,314,573 B1 | 11/2001 | Gordon et al. |
| 6,477,707 B1 | 11/2002 | King et al. |
| 6,505,347 B1 | 1/2003 | Kaneko et al. |
| 6,536,041 B1 | 3/2003 | Knudson et al. |
| 6,614,573 B1 | 9/2003 | Cao |
| 6,654,423 B2 | 11/2003 | Jeong et al. |
| 6,671,853 B1 | 12/2003 | Burkett et al. |
| 6,678,215 B1 | 1/2004 | Treyz et al. |

(Continued)

FOREIGN PATENT DOCUMENTS

| | | |
|---|---|---|
| CA | 2548227 A1 | 6/2005 |
| CN | 1212577 A | 3/1999 |

(Continued)

OTHER PUBLICATIONS

Earnshaw, et al., "The TV—Anytime Content Reference Identifier," Network Working Group, RFC 4078, May 2005.

(Continued)

Primary Examiner — Cong Tran
(74) Attorney, Agent, or Firm — The Marbury Law Group, PLLC

(57) ABSTRACT

System for delivering regional parameters. A method is provided for delivering regional parameters. The method includes receiving a parameter stream that includes one or more sets of regional parameters associated with one or more regions. The method also includes determining a first real-time region indicator, and selecting one or more selected sets of regional parameters from the parameter stream based on the first real-time region indicator.

57 Claims, 6 Drawing Sheets

(56) References Cited

U.S. PATENT DOCUMENTS

| | | |
|---|---|---|
| 6,729,929 B1 * | 5/2004 | Sayers et al. ............... 455/446 |
| 6,760,916 B2 | 7/2004 | Holtz et al. |
| 6,785,551 B1 * | 8/2004 | Richard ............... 455/456.1 |
| 6,857,012 B2 | 2/2005 | Sim et al. |
| 6,863,557 B2 | 3/2005 | Mills et al. |
| 6,886,017 B1 | 4/2005 | Jackson et al. |
| 6,895,486 B2 | 5/2005 | Wong et al. |
| 6,918,132 B2 | 7/2005 | Gargi |
| 6,983,327 B2 | 1/2006 | Koperda et al. |
| 7,003,117 B2 | 2/2006 | Kacker et al. |
| 7,017,174 B1 | 3/2006 | Sheedy |
| 7,043,225 B1 * | 5/2006 | Patel et al. ............... 455/405 |
| 7,053,958 B2 | 5/2006 | Collins et al. |
| 7,085,291 B2 | 8/2006 | Zhang et al. |
| 7,093,754 B2 | 8/2006 | Sako |
| 7,113,776 B2 | 9/2006 | Minear et al. |
| 7,117,439 B2 | 10/2006 | Barrett et al. |
| 7,120,932 B2 | 10/2006 | Lockhart et al. |
| 7,149,189 B2 | 12/2006 | Huntington et al. |
| 7,194,756 B2 | 3/2007 | Addington et al. |
| 7,257,634 B2 | 8/2007 | Colby et al. |
| 7,305,074 B2 | 12/2007 | Hartung et al. |
| 7,376,964 B1 | 5/2008 | Kim |
| 7,386,871 B1 | 6/2008 | Knudson et al. |
| 7,424,708 B2 | 9/2008 | Andersson et al. |
| 7,506,262 B2 | 3/2009 | Gupta et al. |
| 7,565,506 B2 | 7/2009 | Chen et al. |
| 7,600,245 B2 | 10/2009 | Steading et al. |
| 7,620,574 B2 | 11/2009 | Buehl et al. |
| 7,830,833 B2 | 11/2010 | Walker et al. |
| 8,171,250 B2 | 5/2012 | Chen et al. |
| 2001/0037238 A1 | 11/2001 | Gotoh et al. |
| 2001/0052133 A1 | 12/2001 | Pack et al. |
| 2002/0016801 A1 | 2/2002 | Reiley et al. |
| 2002/0042915 A1 | 4/2002 | Kubischta et al. |
| 2002/0054146 A1 | 5/2002 | Fukumoto et al. |
| 2002/0059603 A1 | 5/2002 | Kelts |
| 2002/0124259 A1 | 9/2002 | Chang et al. |
| 2002/0144291 A1 | 10/2002 | Smiley et al. |
| 2002/0157002 A1 | 10/2002 | Messerges et al. |
| 2002/0188663 A1 | 12/2002 | Islam et al. |
| 2002/0194599 A1 | 12/2002 | Mountain |
| 2003/0037331 A1 | 2/2003 | Lee |
| 2003/0040850 A1 | 2/2003 | Najmi et al. |
| 2003/0046369 A1 | 3/2003 | Sim et al. |
| 2003/0069881 A1 | 4/2003 | Huttunen |
| 2003/0072257 A1 | 4/2003 | Ikedo et al. |
| 2003/0100326 A1 * | 5/2003 | Grube et al. ............... 455/515 |
| 2003/0110297 A1 | 6/2003 | Tabatabai et al. |
| 2003/0117445 A1 | 6/2003 | Hendricks et al. |
| 2003/0154492 A1 | 8/2003 | Falvo et al. |
| 2003/0187916 A1 | 10/2003 | Dettinger et al. |
| 2003/0189587 A1 | 10/2003 | White et al. |
| 2003/0191816 A1 | 10/2003 | Landress et al. |
| 2003/0212999 A1 | 11/2003 | Cai |
| 2003/0226151 A1 | 12/2003 | Hamada et al. |
| 2003/0233561 A1 | 12/2003 | Ganesan et al. |
| 2004/0003405 A1 | 1/2004 | Boston et al. |
| 2004/0024809 A1 | 2/2004 | Edwards et al. |
| 2004/0025179 A1 | 2/2004 | Russ et al. |
| 2004/0028049 A1 | 2/2004 | Wan |
| 2004/0031049 A1 | 2/2004 | Suzuki et al. |
| 2004/0039916 A1 | 2/2004 | Aldis et al. |
| 2004/0040039 A1 | 2/2004 | Bernier |
| 2004/0043763 A1 | 3/2004 | Minear et al. |
| 2004/0048503 A1 | 3/2004 | Mills et al. |
| 2004/0083492 A1 | 4/2004 | Goode et al. |
| 2004/0117822 A1 | 6/2004 | Karaoguz et al. |
| 2004/0117831 A1 | 6/2004 | Ellis et al. |
| 2004/0117857 A1 | 6/2004 | Bisdikian et al. |
| 2004/0153547 A1 | 8/2004 | Trossen |
| 2004/0177383 A1 | 9/2004 | Martinolich et al. |
| 2004/0193545 A1 | 9/2004 | Shlasky |
| 2004/0194135 A1 | 9/2004 | Kahn |
| 2004/0216158 A1 | 10/2004 | Blas |
| 2004/0226048 A1 | 11/2004 | Alpert et al. |
| 2004/0236854 A1 | 11/2004 | Roy et al. |
| 2004/0261114 A1 | 12/2004 | Addington et al. |
| 2004/0268420 A1 | 12/2004 | Addington et al. |
| 2005/0010653 A1 | 1/2005 | McCanne |
| 2005/0015765 A1 | 1/2005 | Covell et al. |
| 2005/0015803 A1 | 1/2005 | MacRae et al. |
| 2005/0015804 A1 | 1/2005 | Lajoie et al. |
| 2005/0078677 A1 | 4/2005 | Benting et al. |
| 2005/0085183 A1 | 4/2005 | Lee |
| 2005/0090235 A1 | 4/2005 | Vermola et al. |
| 2005/0108770 A1 | 5/2005 | Karaoguz et al. |
| 2005/0120369 A1 | 6/2005 | Matz |
| 2005/0132207 A1 | 6/2005 | Mourad |
| 2005/0154679 A1 | 7/2005 | Bielak |
| 2005/0160456 A1 | 7/2005 | Moskowitz |
| 2005/0160465 A1 | 7/2005 | Walker |
| 2005/0182852 A1 | 8/2005 | Tinsley et al. |
| 2005/0188403 A1 | 8/2005 | Kotzin |
| 2005/0244148 A1 | 11/2005 | Tsumagari et al. |
| 2005/0264704 A1 | 12/2005 | Leinonen |
| 2005/0276246 A1 | 12/2005 | Walker et al. |
| 2006/0031882 A1 | 2/2006 | Swix et al. |
| 2006/0059045 A1 | 3/2006 | Babbar et al. |
| 2006/0095410 A1 | 5/2006 | Ostrover et al. |
| 2006/0107282 A1 | 5/2006 | De Heer |
| 2006/0112182 A1 | 5/2006 | Chen et al. |
| 2006/0136905 A1 | 6/2006 | Thissen et al. |
| 2006/0200745 A1 | 9/2006 | Furmanski et al. |
| 2006/0205395 A1 | 9/2006 | Barone et al. |
| 2006/0218590 A1 | 9/2006 | White |
| 2006/0277576 A1 | 12/2006 | Acharya et al. |
| 2007/0055629 A1 | 3/2007 | Walker et al. |
| 2007/0061860 A1 | 3/2007 | Walker et al. |
| 2007/0067597 A1 | 3/2007 | Chen et al. |
| 2007/0073834 A1 | 3/2007 | Charlebois et al. |
| 2007/0074240 A1 | 3/2007 | Addington et al. |
| 2007/0078944 A1 | 4/2007 | Charlebois et al. |
| 2007/0104220 A1 | 5/2007 | Charlebois |
| 2007/0106522 A1 | 5/2007 | Collins |
| 2007/0115929 A1 | 5/2007 | Collins et al. |
| 2008/0194196 A1 | 8/2008 | Angelhag et al. |
| 2008/0263599 A1 | 10/2008 | Knudson et al. |
| 2009/0125952 A1 | 5/2009 | Chen et al. |
| 2009/0150922 A1 | 6/2009 | Russ et al. |
| 2010/0154000 A1 | 6/2010 | MacRae et al. |

FOREIGN PATENT DOCUMENTS

| | | |
|---|---|---|
| CN | 1301454 A | 6/2001 |
| CN | 1303568 A | 7/2001 |
| CN | 1310549 A | 8/2001 |
| CN | 2003289520 A | 10/2003 |
| CN | 1568603 | 1/2005 |
| EM | 0820193 | 4/2002 |
| EP | 0609936 | 8/1994 |
| EP | 0749221 | 12/1996 |
| EP | 1089560 | 4/2001 |
| EP | 1193976 | 4/2002 |
| JP | 63036625 A | 2/1988 |
| JP | 1994291780 | 10/1994 |
| JP | 8506938 | 7/1996 |
| JP | 08506941 | 7/1996 |
| JP | 08506942 | 7/1996 |
| JP | 8275077 A | 10/1996 |
| JP | 10276380 A | 10/1998 |
| JP | 11155138 | 6/1999 |
| JP | 1999175426 | 7/1999 |
| JP | 2000349725 | 12/2000 |
| JP | 2001054089 A | 2/2001 |
| JP | 2001092880 A | 4/2001 |
| JP | 2001217860 A | 8/2001 |
| JP | 2001230996 A | 8/2001 |
| JP | 2001519626 A | 10/2001 |
| JP | 2002508637 T | 3/2002 |
| JP | 2002125161 A | 4/2002 |
| JP | 2002171228 A | 6/2002 |
| JP | 2002176589 A | 6/2002 |
| JP | 2003101812 A | 4/2003 |

(56) References Cited

FOREIGN PATENT DOCUMENTS

| | | |
|---|---|---|
| JP | 2003134490 A | 5/2003 |
| JP | 2003203035 A | 7/2003 |
| JP | 2004007063 A | 1/2004 |
| JP | 2004046833 | 2/2004 |
| JP | 2004056178 A | 2/2004 |
| JP | 2004186741 A | 7/2004 |
| JP | 2004287978 A | 10/2004 |
| JP | 2005039853 | 2/2005 |
| JP | 2005079989 A | 3/2005 |
| JP | 2005149129 A | 6/2005 |
| JP | 2006135388 | 5/2006 |
| KR | 19990021860 | 3/1999 |
| KR | 1020000059098 | 10/2000 |
| KR | 20010034740 | 4/2001 |
| KR | 20030001368 | 1/2003 |
| RU | 2073913 C1 | 2/1997 |
| RU | 2220513 | 12/2003 |
| RU | 2239293 | 10/2004 |
| RU | 2254611 | 6/2005 |
| RU | 2321965 | 4/2008 |
| TW | I226797 | 1/2005 |
| TW | I233560 | 6/2005 |
| TW | 200523781 | 7/2005 |
| TW | I242190 | 10/2005 |
| WO | 9414282 | 6/1994 |
| WO | WO9414279 | 6/1994 |
| WO | WO9843427 | 1/1998 |
| WO | 9843426 | 10/1998 |
| WO | 9918721 A1 | 4/1999 |
| WO | WO9949663 A1 | 9/1999 |
| WO | WO9952285 A1 | 10/1999 |
| WO | 0021006 | 4/2000 |
| WO | 0028742 | 5/2000 |
| WO | 0033197 | 6/2000 |
| WO | 0163900 | 8/2001 |
| WO | WO0217567 | 2/2002 |
| WO | 0239741 | 5/2002 |
| WO | 02065803 | 8/2002 |
| WO | 02084524 | 10/2002 |
| WO | 02087273 | 10/2002 |
| WO | 02099673 | 12/2002 |
| WO | WO03003704 A2 | 1/2003 |
| WO | WO2004002187 | 12/2003 |
| WO | 2004021671 | 3/2004 |
| WO | 2004079589 | 9/2004 |
| WO | 2005022791 | 3/2005 |
| WO | 2005045603 | 5/2005 |
| WO | WO2005060257 A1 | 6/2005 |
| WO | 2005069624 | 7/2005 |
| WO | 2006015226 | 2/2006 |
| WO | 2006099239 | 9/2006 |
| WO | WO2007033143 | 3/2007 |

OTHER PUBLICATIONS

Peyret, et al., "Smart Cards Provide Very High Security and Flexibility in Subscribers Management," Aug. 1990, IEE Transactions and Consumer Electronics, vol. 36, No. 3, pp. 744-752.

Wong, et al., "Xstream: A Middleware for Streaming XML Contents over Wireless Environments," IEEE Transactions on Software Engineering, vol. 30, No. 12, Dec. 2004, pp. 918-935.

Wong, et al., "Efficient Management of XML Contents over Wireless Environment by Xstream," 2004 ACM Symposium on Applied Computing, pp. 1122-1127.

ISO-IEC 15706, Information and documentation—International standard Audiovisual No. (ISAN), 2002.

IPDC in DVB-H: Technical Requirements CBMS1026 v1.0.0 Rev. 1/TM 3095 Rev.2, 2004.

OMA: "Mobile Broadcast Services Requirements" Candidate Version 1.0, Feb. 3, 2005, pp. 1-69, pp. 14-21.

International Search Report—PCT/US06/060690, International Search Authority—European Patent Office, Mar. 23, 2007.

Written Opinion—PCT/US06/060690, International Search Authority—European Patent Office, Mar. 23, 2007.

International Preliminary Report on Patentability—PCT/US06/060690, The International Bureau of WIPO—Geneva, Switzerland, May 22, 2008.

Das, S., "STAR News Goes Pay, to Attract Flat Rate of Rs 2," Financial Express, Aug. 4, 1999.

ESG Datamodel Comparison between OMA BCAST and DVB CBMS, Aug. 22, 2005, Open Mobile Alliance LTD.

Landler, M., "The Dishes Are Coming: Satellites Go Suburban," New York Times, Late Edition—Final Ed., col. 5, p. 37, May 29, 1995.

Miller, A.L., "Cable Company Changes Channels Prestige Offers Cheaper Service," Baltimore Morning Sun, CAR edition, p. 8B, Oct. 21, 1992.

Steinberg, D., "Comcast to Roll out New Sports Package for Digital Cable," Philadelphia Inquirer, City edition, p. D02, Aug. 1, 2004.

Taiwanese Search report -095133272—TIPO—Oct. 7, 2010(051256).

Supplementary European Search Report—EP06803088—Search Authority—The Hague—Feb. 10, 2011 (050012EP).

Taiwanese Search report—095133703—TIPO—Apr. 8, 2010 (051242).

Tomoko Itao, Introduction of Dynamically Adaptive Networking Service Environment: Danse, Multimedia, Distributed, Cooperative and Mobile (DICOMO), Symposium Collected Papers, 1997-2000, Ver. 1 .1. [DVD-ROM], Japan, Aggregate Corporation Information Processing Society, Jul. 2, 1997, pp. 125-130.

Office Action in Canadian application 2621676 corresponding to U.S. Appl. No. 12/353,869, citing CA2548227 and US20040048503 dated Jan. 13, 2011 (051256CA).

Translation of Office Action in Chinese application 200680041815.8 corresponding to U.S. Appl. No. 11/270,372, citing CN1303568 dated Feb. 10, 2011 (051242CN).

Translation of Office Action in Japan application 2008-540332 corresponding to U.S. Appl. No. 11/270,165, citing WO2005045603A2, IPDC_in_DVB_H_pgs_1_40_XP002990830_year_2004, JP2005039853 and JP11155138 dated Mar. 8, 2011 (060137JP).

Translation of Office Action in Japan application 2008-540334 corresponding to U.S. Appl. No. 11/270,167, citing JP8506938 and JP2006135388 dated Feb. 8, 2011 (060138JP).

Wong, et al., Xstream: A Middleware for Streaming XML Contents over Wireless Environments, IEEE Transactions on Software Engineering, Dec. 2004, vol. 30, No. 12.

Kazuo Masuda, "Visual Explorer of Kazuo Masuda," PC User, Softbank Publishing Corp., Mar. 2005, vol. 12, No. 3, pp. 78-81.

* cited by examiner

METHODS AND APPARATUS FOR DELIVERING REGIONAL PARAMETERS

REFERENCE TO CO-PENDING APPLICATIONS FOR PATENT

The present application for patent is related to the following co-pending U.S. patent applications:

"METHODS AND APPARATUS FOR DISTRIBUTING CONTENT TO SUPPORT MULTIPLE CUSTOMER SERVICE ENTITIES AND CONENT CONTENT PACKAGERS", U.S. patent application Ser. No. 11/270,199, filed concurrently herewith, assigned to the assignee hereof, and expressly incorporated by reference herein, "APPARATUS AND METHODS OF OPEN AND CLOSED PACKAGE SUBSCRIPTION", U.S. patent application Ser. No. 11/270,372, filed concurrently herewith, assigned to the assignee hereof, and expressly incorporated by reference herein, "METHOD AND APPARATUS FOR DELIVERING CONTENT BASED ON RECEIVERS CHARACTERISTICS", U.S. patent application Ser. No. 11/270,413, filed concurrently herewith, now U.S. Pat. No. 7,565,506 issued on Jul. 21, 2009, assigned to the assignee hereof, and expressly incorporated by reference herein, "APPARATUS AND METHODS FOR PROVIDING AND PRESENTING CUSTOMIZED CHANNEL INFORMATION", U.S. patent application Ser. No. 11/270,166, filed concurrently herewith, assigned to the assignee hereof, and expressly incorporated by reference herein, "APPARATUS AND METHODS FOR DELIVERING AND PRESENTING AUXILIARY SERVICES FOR CUSTOMIZING A CHANNEL", U.S. patent application Ser. No. 11/270,370, filed concurrently herewith, assigned to the assignee hereof, and expressly incorporated by reference herein, "METHODS AND APPARATUS FOR FRAGMENTING SYSTEM INFORMATION MESSAGES IN WIRELESS NETWORKS", U.S. patent application Ser. No. 11/270,168, filed concurrently herewith, assigned to the assignee hereof, and expressly incorporated by reference herein, "FLEXIBLE SYSTEM FOR DISTRIBUTING CONTENT TO A DEVICE", U.S. patent application Ser. No. 11/270,165, filed concurrently herewith, assigned to the assignee hereof, and expressly incorporated by reference herein, "SYSTEM FOR DISTRIBUTING PACKAGES AND CHANNELS TO A DEVICE" U.S. patent application Ser. No. 11/270,167, filed concurrently herewith, assigned to the assignee hereof, and expressly incorporated by reference herein; and "METHODS AND APPARATUS FOR PROVIDING SYSTEM INFORMATION TO A WIRELESS DEVICE", 60/735,044, filed concurrently herewith, assigned to the assignee hereof, and expressly incorporated by reference herein.

FIELD

The present application relates generally to parameter acquisition in a data network, and more particularly to a system for delivering regional parameters over a wide area network.

BACKGROUND

In current content delivery/media distribution systems, programming information that describes a delivery schedule of available content and/or services may be provided to devices in a distribution network. For example, a content distribution server that operates on the distribution network may provide the programming information to devices in communication with the network. Devices receiving the programming information operate to display the information in a two dimensional program guide (PG) to device users who may then select content and/or services to be received. For example, a device user views the PG and may then select and subscribe to receive content and/or services that include multimedia content, clips, programs, scripts, data, customer services, or any other type of content or service.

In conventional wide area networks, all programming information is delivered to all devices in the network whether or not the described content is available in a device's current operating area. For example, the programming information describes all programming available in the wide area network; however, in order to receive selected programming, a device may need to be operating within a certain region of the network. Thus, it is possible for a device to attempt to subscribe to programming that it cannot receive because of its location in the network. As a result, device users may become frustrated with the operation of the device, and may ultimately choose not to subscribe to receive content because of the bad user experience.

Therefore, what is needed is a system that operates to allow regional parameters to be delivered to devices operating in a wide area network so that devices are able to receive accurate programming information about content and/or services that are actually delivered in their operating regions.

SUMMARY

In one or more embodiments, a system for delivering regional parameters over a wide area network is provided. In one embodiment, the system operates to produce a parameter stream comprising one or more sets of regional parameters. The parameter stream is transmitted over a wide area network. A selected set of regional parameters are selected by a device based on the device's current position, which is determined in real-time. Thus, the system provides a fast and efficient mechanism for delivering information about content and/or services that are actually delivered in a particular device's operating region.

In one embodiment, a method is provided for delivering regional parameters. The method comprises receiving a parameter stream that comprises one or more sets of regional parameters associated with one or more regions. The method also comprises determining a first real-time region indicator, and selecting one or more selected sets of regional parameters from the parameter stream based on the first real-time region indicator.

In one embodiment, an apparatus is provided for delivering regional parameters. The apparatus comprises transceiver logic configured to receive a parameter stream that comprises one or more sets of regional parameters associated with one or more regions. The apparatus also comprises positioning logic configured to determine a first real-time region indicator, and processing logic configured to select one or more selected sets of regional parameters from the parameter stream based on the first real-time region indicator.

In one embodiment, an apparatus is provided for delivering regional parameters. The apparatus comprises means for receiving a parameter stream that comprises one or more sets of regional parameters associated with one or more regions. The apparatus also comprises means for determining a first real-time region indicator, and means for selecting one or more selected sets of regional parameters from the parameter stream based on the first real-time region indicator.

In one embodiment, a computer-readable media is provided that comprises instructions, which when executed by at least one processor, operate to deliver regional parameters. The computer-readable media comprises instructions for receiving a parameter stream that comprises one or more sets of regional parameters associated with one or more regions. The computer-readable media also comprises instructions for determining a first real-time region indicator, and instructions for selecting one or more selected sets of regional parameters from the parameter stream based on the first real-time region indicator.

In one embodiment, at least one processor is provided that is configured to perform a method for delivering regional parameters. The method comprises receiving a parameter stream that comprises one or more sets of regional parameters associated with one or more regions. The method also comprises determining a first real-time region indicator, and selecting one or more selected sets of regional parameters from the parameter stream based on the first real-time region indicator.

In one embodiment, a method is provided for delivering regional parameters. The method comprises determining one or more sets of regional parameters associated with one or more regions and adding one or more region identifiers to each of the one or more sets of regional parameters, wherein the one or more region identifiers indicate selected regions to which each of the one or more sets of regional parameters apply. The method also comprises generating a first parameter stream that comprises a first portion of the one or more sets of regional parameters.

In one embodiment, an apparatus is provided for delivering regional parameters. The apparatus comprises processing logic configured to determine one or more sets of regional parameters associated with one or more regions. The apparatus also comprises stream generation logic configured to add one or more region identifiers to each of the one or more sets of regional parameters, wherein the one or more region identifiers indicate selected regions to which each of the one or more sets of regional parameters apply, and to generate a first parameter stream that comprises a first portion of the one or more sets of regional parameters.

In one embodiment, at least one processor is provided that is configured to perform a method for delivering regional parameters. The method comprises determining one or more sets of regional parameters associated with one or more regions, and adding one or more region identifiers to each of the one or more sets of regional parameters, wherein the one or more region identifiers indicate selected regions to which each of the one or more sets of regional parameters apply. The method also comprises generating a first parameter stream that comprises a first portion of the one or more sets of regional parameters.

In one embodiment, an apparatus is provided for delivering regional parameters. The apparatus comprises means for determining one or more sets of regional parameters associated with one or more regions, and means for adding one or more region identifiers to each of the one or more sets of regional parameters, wherein the one or more region identifiers indicate selected regions to which each of the one or more sets of regional parameters apply. The apparatus also comprises mean for generating a first parameter stream that comprises a first portion of the one or more sets of regional parameters.

In one embodiment, a parameter message is provided that operates to provide system information to a device in delivery system. The parameter message comprises a first set of parameters identifying one or more packages and services, and a second set of parameters associated with the first set of parameters, wherein the second set of parameters identify regions in which selected packages and services are available.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

The following detailed description describes embodiments of a delivery system for delivering regional parameters over a wide area network. The system is especially well suited for delivering regional parameters to portable devices that may move from region to region during operation. The regional parameters comprise subscription information, programming guides, schedules, multimedia content, clips, real-time and non real-time presentations, services, and/or any other information that is to be distributed over regions of a wide area network. Regional parameters may be delivered to virtually any type of portable device, including but not limited to, portable telephones, PDAs, email devices, notebook computers, tablet computers or any other type of portable device. Furthermore, the system may be used in any type of network environment, including but not limited to, communication networks, content distribution networks, public networks, such as the Internet, private networks, such as virtual private networks (VPN), local area networks, wide area networks, long haul networks, or any other type of data or communication network.

In one or more embodiments, regional parameters operate to associate subscription information, packages, services or other types of content or services to one or more regions. The following definitions are used herein to describe embodiments of the delivery system.

Package A package is a collection of one or more tiers that are offered on a subscription basis.

Tier A tier is a collection of one or more services.

Service A service comprises a sequence of presentations offered under a single label and delivered using a defined set of flows. A service represents the smallest element that may be subscribed to in a distribution system.

Figure 1:
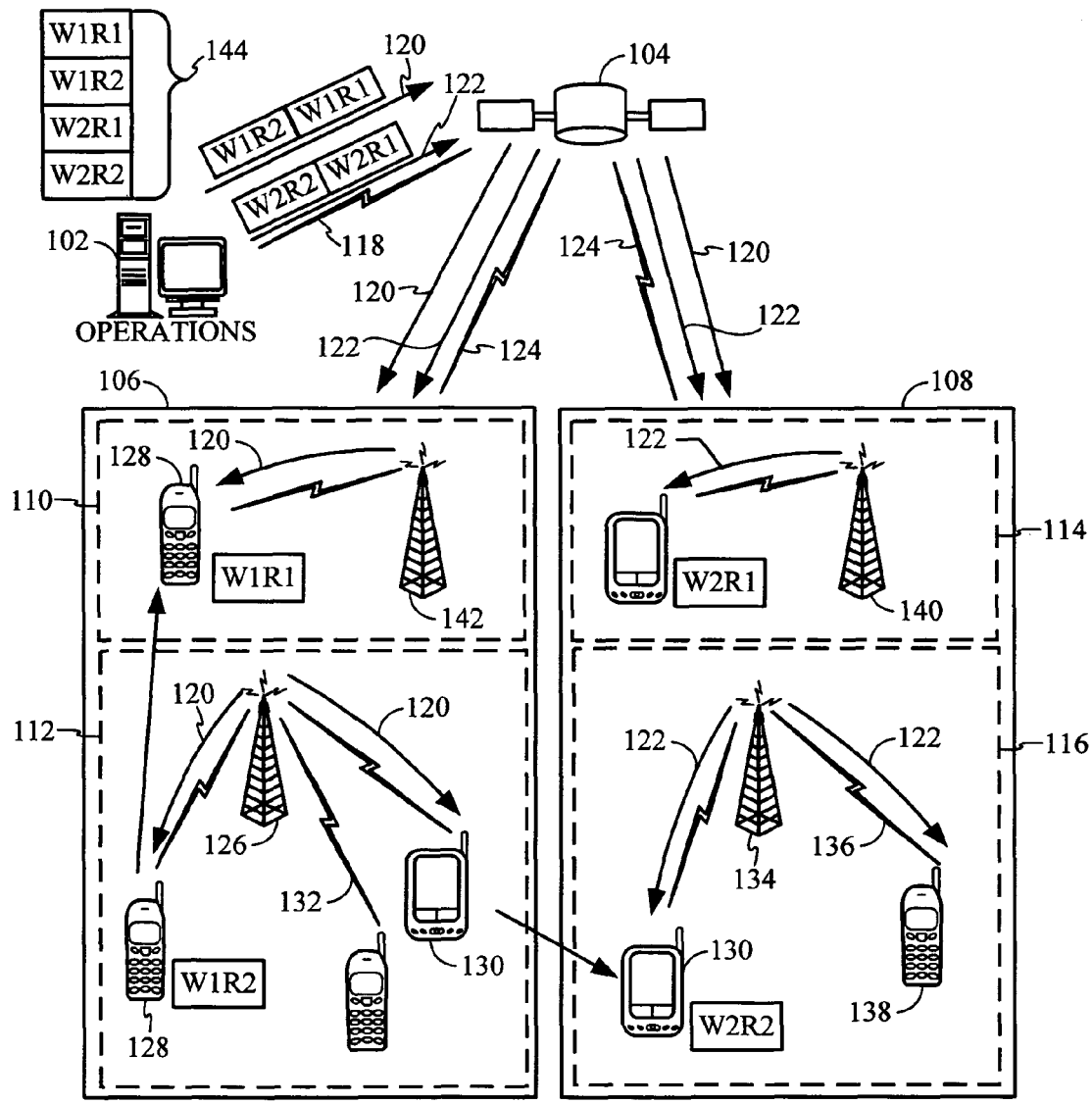
FIG. 1 shows a network that comprises one embodiment of a system for delivering regional parameters.

FIG. 1 shows a network 100 that comprises one embodiment of a delivery system for delivering regional parameters. The network 100 comprises an operations center 102 that operates to distribute parameters to devices coupled to a wide area network. For example, in one embodiment, the parameters comprise programming information that describes programming content available for devices to subscribe to received over the network 100.

In this embodiment, the network 100 comprises a first wide area network 106 and a second wide area network 108. For example, the wide area networks 106 and 108 may cover the entire U.S., portions of the U.S., or individual states. In another embodiment, the wide area networks 106 and 108 may cover different countries.

The operations center 102 communicates parameters to the wide area networks 106, 108 through a satellite communication system and satellite 104. For example, the operations center 102 communicates information to the satellite 104 through the communication link 118. The satellite 104 then communicates the information to the wide area networks 106, 108 through the communication links 124. It should be noted that the satellite communication system including the communication links 118 and 124 may utilize any suitable communication technique or technology.

In other embodiments, the operations center 102 communicates parameters to the wide area networks 106, 108 using one or more other communication technologies. For example, in one embodiment, a terrestrial communication system, such as a wireless communication network is utilized to provide a communication link between the operations center 102 and the wide area networks 106, 108. In another embodiment, a hardwired communication link, such as a wired network connection is utilized to provide a communication link between the operations center 102 and the wide area networks 106, 108. In still another embodiment, any combination of wired and wireless communication links are utilized to provide a communication link between the operations center 102 and the wide area networks 106, 108. Thus, the delivery system is not limited to the satellite system shown, so that any suitable communication system or technology may be used to provide a communication link between the operations center 102 and the wide area networks 106, 108.

The wide area networks 106 and 108 comprise one or more regions. For example, the wide area network 106 comprises regions 110 and 112. The wide area network 108 comprises regions 114 and 116. For example the wide area network 106 may cover a particular state and the region 110 may cover the northern portion of the state and the region 112 may cover the southern portion of the state. It should be noted that embodiments of the delivery system are suitable for use with any number of wide area networks and that each wide area network may comprise any number of regions. In one embodiment, a wide area network is comprised of only one region. In another embodiment, a region in a first wide area network is defined to be a second wide area network, which in turn is comprised of one or more sub-regions. In still another embodiment, a wide area network comprises several smaller regions and one or more overlapping regions that overlap one or more smaller regions. In one embodiment, an overlapping region is the size of the entire wide area network.

The operations center 102 comprises regional parameters 144 that are associated with selected regions. For example, the regional parameters 144 describe content that is available to be received in a particular region of a particular wide area network. In one embodiment, content providers provide the regional parameters 144 to the operations center 102 for distribution to devices operating in each region. In this embodiment, the regional parameters 144 comprise parameter sets for the following regions.

1. W1R1—Wide area network 106, region 110
2. W1R2—Wide area network 106, region 112
3. W2R1—Wide area network 108, region 114
4. W2R2—Wide area network 108, region 116

In one embodiment, the operations center 102 operates to generate one or more parameter streams that include one or more of the regional parameter sets along with any necessary wide area parameters. Each regional parameter set that is included in a parameter stream comprises a region identifier that identifies the region for which the parameters apply. Once the parameter streams are generated they are transmitted to the wide area networks 106 and 108 through the satellite 104. For example, a first parameters stream 120 is generated that comprises regional parameter sets W1R1 and W1R2. A second parameter stream 122 is generated that comprises regional parameter sets W2R1 and W2R2.

The parameter streams 120 and 122 are transmitted to the wide area networks 106 and 108 using the satellite communication system and satellite 104. Each wide area network comprises transceivers that operate to receive the parameter streams. In one embodiment, the transceivers in each wide area operate to broadcast all received streams to devices in their respective areas. In another embodiment, the transceivers in each wide area operate to filter the received parameter streams and retransmit only those streams designated for broadcast in their respective networks. For example, the transceivers 126 and 142 operate to receive and retransmit the parameters stream 120 to devices in the wide area network 106. Likewise, transceivers 140 and 134 operate to receive and retransmit the parameters stream 122 to devices in the wide area network 108. For example, the transceiver 126 utilizes communication links 132 to transmit the parameters stream 120 to devices 128 and 130. The transceiver 134 uses communication link 136 to transmit the parameter stream 122 to the device 138. In one embodiment, each of the parameter streams 120, 122 include information describing wide area networks to which the stream is to be broadcast. Thus, devices in each wide area network may receive only those streams associated with the wide area network in which they reside. In another embodiment, the parameter streams 120, 122 include information indicating that each stream is to be broadcast to all wide area networks. In this case, devices within a wide area network receive all streams that have been transmitted by the operations center 102.

Each of the devices in the wide area networks 106 and 108 comprise positioning logic that operates to determine a position indicator in real-time for that device. The position indicator allows a device to determine the wide area network and real-time region in which it is currently located. In one embodiment, a device receives a parameters stream, and based on its position indicator, operates to obtain the regional parameter set for the region in which it is located. For example, the device 128 determines from its position indicator that it is in the region 112. The device 128 receives the parameter stream 120 and uses its position indicator to obtain the parameters set W1R2 that is associated with the region 112. In a similar fashion, all the devices in the wide area networks 106 and 108 are able to obtain regional parameters based on their current location.

In another embodiment, a new set of regional parameters is delivered to a device as the device moves from region to region. For example, as the device 128 moves into region 110 its position indicator is updated to reflect it's new position. As it receives the parameter stream 120, it uses its new position indicator to obtain the parameter set W1R1. Thus, the device 128 is now able to subscribe, receive content, services, parameters, or other information that is available in region 110. In a similar fashion, a new set of regional parameters is delivered as the device moves into a different wide area network. For example, as the device 130 moves into region 116 of wide area network 108, its position indicator is updated to reflect it's new real-time position. As it receives the parameter stream 122, it uses its new position indicator to obtain the parameter set W2R2. Thus, the device is now able to subscribe to content available in region 116.

Therefore, embodiments of the delivery system operate to allow a regional parameter set to be delivered to a mobile device as the device moves between regions of one or more wide area networks. As a result, the device user is able to see what regional content is available for subscription.

Figure 2:
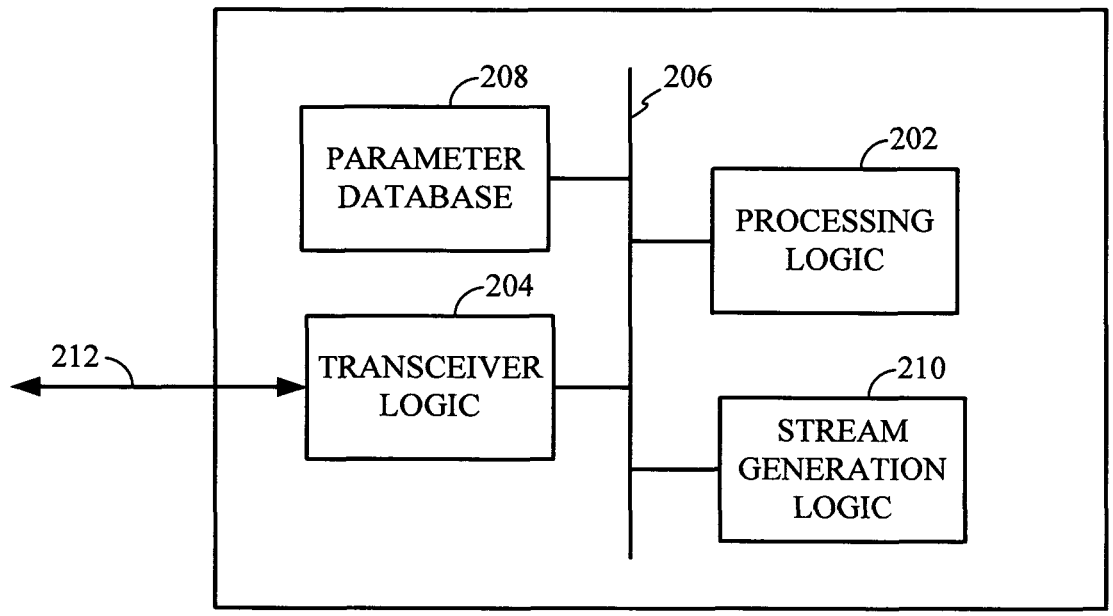
FIG. 2 shows one embodiment of an operations server for use in one embodiment of a system for delivering regional parameters.

FIG. 2 shows one embodiment of an operations server 200 for use in one embodiment of a delivery system for delivering regional parameters. For example, the operations server 200 is suitable for use as the operations server 102 shown in FIG. 1. The operations server 200 comprises processing logic 202 and transceiver logic 208, which are coupled to an internal data bus 206. The operations server system 200 also comprises parameter database 208 and stream generator logic 210, which are also coupled to the data bus 206.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the operations server 200 via the internal data bus 206.

The transceiver logic 204 comprises hardware logic and/or software that operate to allow the operations server 200 to transmit and receive data and/or other information with remote devices or systems using communication channel 212. For example, in one embodiment, the communication channel 212 comprises any suitable type of communication link to allow the operations server 200 to communicate with one or more data networks. For example, in one embodiment, the transceiver logic 204 operates to receive regional parameters from one or more remote content servers. The operations server 200 then operates to store the regional parameters in the parameter database 208 and process the regional parameters to produce one or more parameter streams that are transmitted to devices operating on one or more wide area networks.

The parameter database 208 comprises a database stored in any suitable type of memory device that is operable to store network parameters. For example, the memory may comprises any type of RAM, Flash memory, hard disk, optical disk, or any other type of memory device. In one embodiment, the parameter database 208 stores parameters for one or more wide area networks and one or more sets of regional parameters that are associated with each wide area network. In one embodiment, the regional parameters identify content and/or services that are available for subscription by devices operating in a selected region.

The stream generation logic 210 comprises a CPU, processor, gate array, hardware logic, memory elements, virtual machine, software, and/or any combination of hardware and software. Thus, the stream generation logic 210 generally comprises logic to execute machine-readable instructions and/or hardware to generate one or more wide area parameters streams.

In one embodiment, the stream generation logic 210 operates to generate a parameter stream that comprises wide area network parameters and one or more sets of regional parameters associated with each wide area network. For example, in one embodiment, the wide area parameters comprise parameters that identify a particular wide area network, its coverage area, and any other wide area information. In one embodiment, a set of regional parameters comprise region identifiers that identify one or more regions in which the parameters are applicable. The regional parameters may also comprise content and/or service identifiers that identify content and/or services that are available within a particular region. For example, the regional parameters identify content to which a device in a particular region may subscribe to receive. A more detailed description of a parameter stream generated by the stream generation logic 210 is provided in another section of this document.

During operation of one or more embodiments, the operations server 200 operates to deliver regional parameters associated with one or more wide area networks. For example, a set of regional parameters may be delivered to a device operating in a selected region of a wide area network. In one or more embodiments, the delivery system operates to perform one or more of the following functions.

1. Obtain sets of regional parameters for delivery over one or more wide area networks.
2. Generate one or more parameter streams for one or more wide area networks that comprise one or more sets of regional parameters for each wide area network.
3. Transmit the parameter streams to the one or more wide area networks.

In one embodiment, the delivery system comprises program instructions stored on a computer-readable medium, which when executed by at least one processor, for instance, the processing logic 202, provides the functions described herein. For example, the program instructions may be loaded into the operations server 200 from a computer-readable media, such as a floppy disk, CDROM, memory card, FLASH memory device, RAM, ROM, or any other type of memory device or computer-readable medium that interfaces to the operations server 200. In another embodiment, the instructions may be downloaded into the operations server 200 from an external device or network resource that interfaces to the operations server 200 through the transceiver logic 204. The program instructions, when executed by the processing logic 202, provide one or more embodiments of a delivery system as described herein.

Therefore, the operations server 200 operates in one or more embodiments of a delivery system to deliver regional parameters to devices operating on one or more wide area networks. It should be noted that the operations server 200 illustrates just one implementation and that other implementations are possible within the scope of the embodiments.

Figure 3:
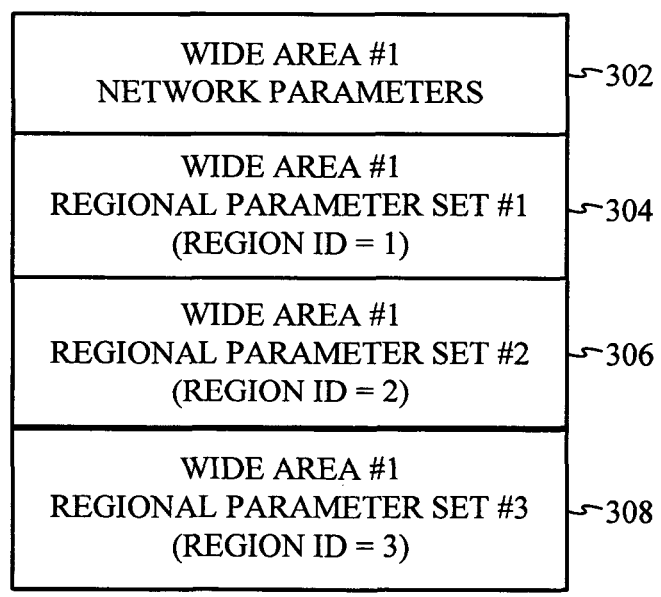
FIG. 3 shows one embodiment of a parameter stream for use in one embodiment of a system for delivering regional parameters.

FIG. 3 shows one embodiment of a parameters stream 300 generated during operation of one embodiment of a delivery system. For example, the parameters stream 300 may be generated by the stream generator logic 210 shown in FIG. 2.

The parameter stream 300 comprises wide area #1 network parameters 302. These parameters may comprise any suitable format and operate to provide information about the parameter stream 300 to transceiver systems associated with wide area network #1. For example, the parameters included in the stream 300 may identify the stream 300, and/or may include one or more distribution parameters that describe how the stream 300 is to be distributed throughout the wide area network #1.

The parameter stream 300 also comprises regional parameters sets 304, 306, and 308. The regional parameter sets 304, 306, and 308 operate to provide regional parameters that are applicable to selected regions of the wide area network #1. For example, the regional parameter set 304 may comprises any type of information that is formatted in any suitable format that operates to identify content and/or services that are available for devices to subscribe to within a selected region of the wide area network #1. The regional parameter sets 304, 306, and 308 also comprise region identifiers (ID) that identify the regions for which the parameters apply. Thus, regional parameter set 304 provides parameters applicable to a first region of the wide area network #1, regional parameter set 306 provides parameters applicable to a second region of the wide area network #1, and regional parameter set 308 provides parameters applicable to a third region of the wide area network #1. It should be noted that the wide area network #1 may comprise any number of regions and that these region may be distinct or overlapping to any degree. It should also be noted that embodiments of the delivery system may operate to generate any number of parameter streams. For example, the operations server 200 may operate to generate any number of parameter streams that are associated with any number of wide area networks.

Figure 4:
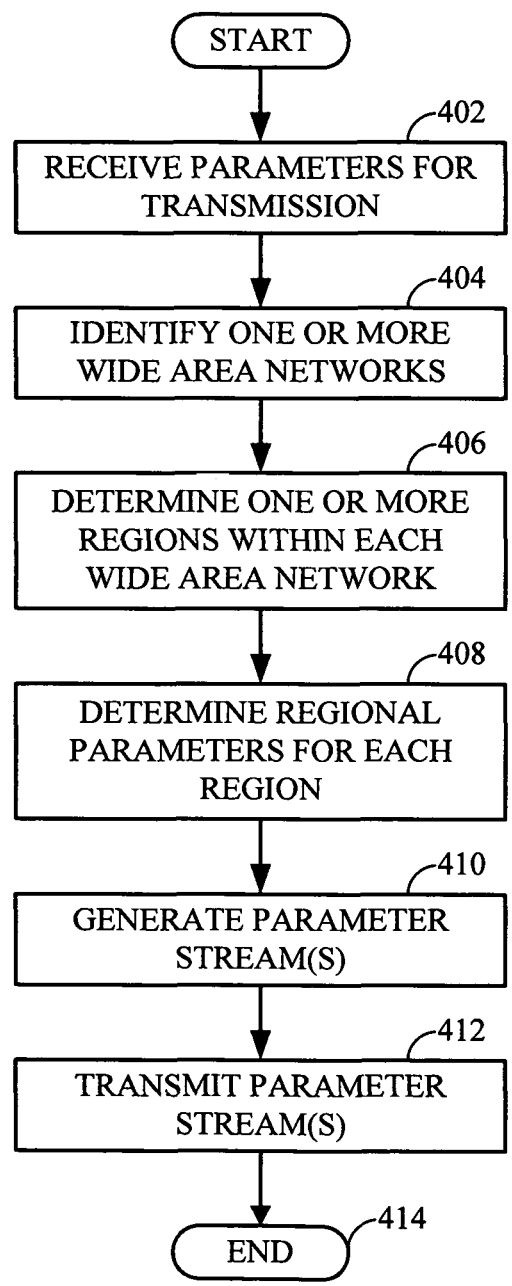
FIG. 4 shows one embodiment of a method for operating an operations server in one embodiment of a system for delivering regional parameters.

FIG. 4 shows one embodiment of a method 400 for operating an operations server in one embodiment of a delivery system. For clarity, the method 400 will be described with reference to the operations server 200 shown in FIG. 2. In one embodiment, at least one processor, such as the processing logic 202, executes machine readable instructions to control the server 200 to perform the functions described below.

At block 402, one or more parameters are received for inclusion in one or more parameter streams. For example, one or more content providers provide one or more regional parameters sets describing content available for subscription in one or more regions. In one embodiment, the parameter sets are received by the transceiver logic 204 and stored in the parameter database 208.

At block 404, one or more wide area networks to receive parameter streams are identified. For example, the processing logic 202 operates to identify one or more wide area networks that are to receive parameter streams that contain parameters stored in the parameter database 208.

At block 406, one or more regions within each wide area network are identified. For example, the processing logic 202 operates to identify one or more regions within each wide area network that are to receive regional parameters.

At block 408, regional parameters for each of the identified regions are determined. For example, the processing logic 202 operates to search the database 208 to determine regional parameters associated with each region.

At block 410, one or more parameter streams are generated. For example, the stream generation logic 210 operates to generate a parameter stream for each wide area network. In one embodiment, the generated parameter streams are formatted as shown in FIG. 3 so that each set of regional parameters has one or more region identifiers added. For example, the region identifiers indicate to which regions any particular set of regional parameters apply. As a result, the parameter stream generated for each wide area network comprises one or more sets of regional parameters (including region identifiers) that identify available content and/or services for each defined region of the wide area network.

At block 412, the generated parameter streams are transmitted to the associated wide area networks. For example, the transceiver logic 204 broadcasts the parameter streams to the wide area networks through the communication channel 212. The method then ends at block 414.

Thus, the method 400 operates to deliver regional parameters to devices in a wide area network. It should be noted that the method 400 represents just one implementation and that other implementations are possible within the scope of the embodiments.

Figure 5:
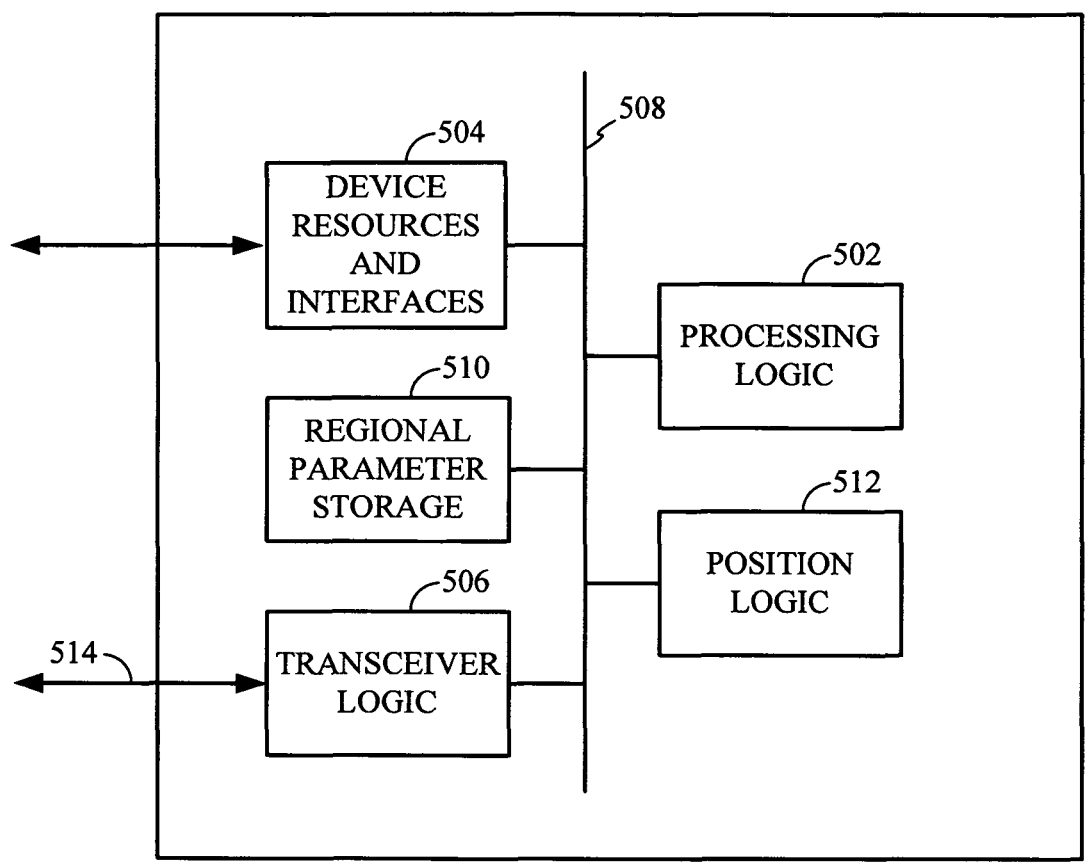
FIG. 5 shows one embodiment of a device for use in one embodiment of a system for delivering regional parameters.

FIG. 5 shows one embodiment of a device 500 for use in one embodiment of a system for delivering regional parameters. For example, the device 500 is suitable for use as either of the devices 128 and 130 shown in FIG. 1. The device 500 comprises processing logic 502, device resources and interface logic 504, and transceiver logic 506, which are coupled to an internal data bus 508. The device 500 also comprises regional parameter storage 510 and position logic 512, which are also coupled to the data bus 508.

In one or more embodiments, the processing logic 502 comprises a CPU, processor, gate array, hardware logic, memory elements, virtual machine, software, and/or any combination of hardware and software. Thus, the processing logic 502 generally comprises logic to execute machine-readable instructions and to control one or more other functional elements of the device 500 via the internal data bus 508.

The device resources and interfaces logic 504 comprise hardware and/or software that allow the device 500 to communicate with internal and external systems. For example, the internal systems may include mass storage systems, memory, display driver, modem, or other internal device resources. The external systems may include user interface devices, displays, printers, disk drives, keyboard, keypad, cursor keys, pointing device, or any other local devices or systems. For example, the device I/F logic 504 operates to receive user inputs from a keypad, and output information to be displayed on a device display.

The transceiver logic 506 comprises hardware logic and/or software that operate to allow the device 500 to transmit and receive data and/or other information with remote devices or systems using communication channel 514. For example, in one embodiment, the communication channel 514 comprises any suitable type of communication link to allow the device 500 to communicate with one or more data networks. For example, in one embodiment, the transceiver logic 506 operates to receive a parameter stream from one or more remote servers. The parameters from the received parameter stream may then be stored in the regional parameter storage 510.

The regional parameter storage 510 comprises a database stored in any suitable type of memory device that is operable to store regional parameters. For example, the memory may comprises any type of RAM, Flash memory, hard disk, optical disk, or any other type of memory device. In one embodiment, the regional parameter storage 510 stores parameters for one or more regions of a wide area network. In one embodiment, the regional parameters identify content and/or services that are available for subscription by devices operating in a selected region.

The position logic 512 comprises a CPU, processor, gate array, hardware logic, memory elements, virtual machine, software, and/or any combination of hardware and software. Thus, the position logic 512 generally comprises logic to execute machine-readable instructions and/or hardware to determine a device position or operating region.

In one embodiment, the position logic 512 operates to determine a position indicator in real-time that indicates the current position of the device 500. For the purpose of this description, a real-time position indicator is defined as a position indicator that is determined in real-time by the position logic 512. For example, in one embodiment, the position logic 512 comprises global positioning system (GPS) logic or any other type of positioning logic that may be used to determine the current geographic position of the device 500 as the device 500 moves from region to region. Thus, the position logic 512 operates to determine the current position of the device in real-time to obtain the real-time position indicator. In a similar fashion, once the real-time position indicator has been determined, it may be used to determine a real-time region indicator, which indicates the current operating region of the device 500.

In one embodiment, the position logic 512 determines the position indicator in real-time from information received in a local transmission. For example, in one embodiment, one or more transmitters transmit position information to the device 500 during periodic communications. The position logic 512 operates to obtain the transmitted position information and use it to determine the position indicator in real-time. The real-time position indicator is used to determine a real-time region indicator. For example, the real-time region indicator indicates a selected region in a wide area network in which the device is currently located.

In one embodiment, the processing logic 502 operates to compare the real-time region indicator determined by the position logic 512 to region identifiers included in a received parameter stream. For example, a received parameter stream comprises one or more sets of regional parameters that include associated region indicators. The processing logic 502 compares the real-time region indicator to the region indicators of the parameters stream, and if they match, the processing logic 502 selects the associated sets of region parameters for storage in the regional parameter storage 510. After one or more sets of regional parameters have been selected, the processing logic 502 operates to render the stored information on a device display using the device resources 504.

During operation of one or more embodiments, the device 500 operates to receive sets of regional parameters associated with one or more wide area networks. For example, a set of regional parameters may be delivered to the device 500 based on the device's real-time operating region in a selected wide area network. In one or more embodiments, the device 500 operates to perform one or more of the following functions.
1. Obtain a parameter stream for a selected wide area network.
2. Determine a position indicator that indicates the device's current real-time position and real-time region indicator.
3. Select a set of regional parameters from the parameter stream based on the real-time region indicator.
4. Render information from the selected set of regional parameters to allow a device user to subscribe to content and/or services available in the device's current operating region.

In one embodiment, the delivery system comprises program instructions stored on a computer-readable medium, which when executed by at least one processor, for instance, the processing logic 502, provides the functions described herein. For example, the program instructions may be loaded into the device 500 from a computer-readable media, such as a floppy disk, CDROM, memory card, FLASH memory device, RAM, ROM, or any other type of memory device or computer-readable medium that interfaces to the device 500. In another embodiment, the instructions may be downloaded into the device 500 from an external device or network resource that interfaces to the device 500 through the transceiver logic 506. The program instructions, when executed by the processing logic 502, provide one or more embodiments of a delivery system as described herein.

Therefore, the device 500 operates in one or more embodiments of a delivery system to receive regional parameters from a parameter stream based on a device position indicator or operating region. It should be noted that the device 500 illustrates just one implementation and that other implementations are possible within the scope of the embodiments.

Figure 6:
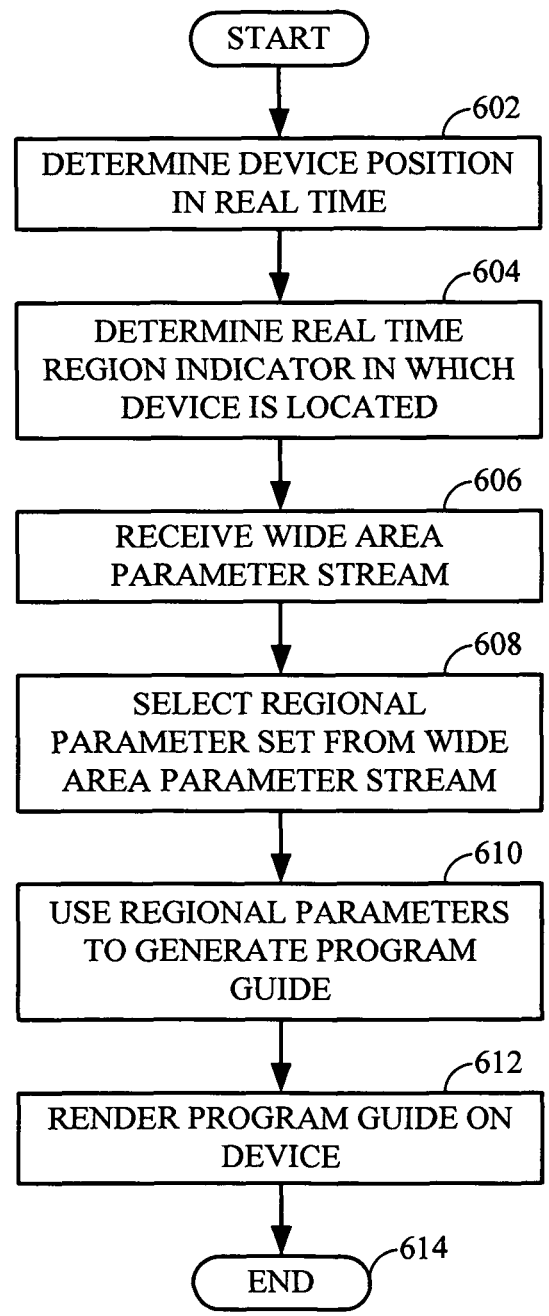
FIG. 6 shows one embodiment of a method for operating a device in one embodiment of a system for delivering regional parameters.

FIG. 6 shows one embodiment of a method 600 for operating a device in one embodiment of a delivery system. For clarity, the method 600 will be described with reference to the device 500 shown in FIG. 5. In one embodiment, at least one processor, such as the processing logic 502, executes machine readable instructions to control the device 500 to perform the functions described below.

At block 602, a device position is determined in real-time. For example, in one embodiment, the device comprises position logic 512 that operates to determine a real-time position indicator. For example, the position logic 512 may comprises GPS logic or any other type of positioning logic to determine the real-time position indicator, which indicates the position of the device as it moves from region to region.

At block 604, the device determines its current real-time region indicator based on the position indicator. For example, in one embodiment, the processing logic 502 is aware of the locations of one or more operating regions associated with a wide area network. The processing logic 502 determines which of the operating regions the device is currently located in based on its real-time region indicator.

At block 606, a wide area parameter stream is received. For example, in one embodiment, the parameter stream is broadcast over a wide area network and the transceiver logic 506 operates to receive the parameter stream through the channel 514. In one embodiment, the parameter stream comprises one or more sets of regional parameters associated with the wide area network.

At block 608, a set of regional parameters associated with the current operating region of the device is selected from the received parameters stream. For example, in one embodiment, the processing logic 502 processes the received parameter stream to obtain the regional parameters associated with the device's current operating region. For example, the processing logic 502 compares a region identifier associated with each of the regional parameter sets to the device's known real-time region indicator. When a match occurs, the processing logic 502 then selects and stores the associated set of regional parameters in the regional parameter storage 510.

At block 610, the selected regional parameters are used to generate information about content and/or services that are available in the device's current operating region. For example, in one embodiment, the processing logic 502 processes the regional parameters in the regional parameter storage 510 to produce a program guide that describes the available content and/or services.

At block 612, the program guide is rendered on the device. For example, in one embodiment, the processing logic 502 controls the device resources and interfaces 504 to render the program guide on a device display. After the program guide is displayed to the device user, one or more available content and/or services may be selected by the user for subscription. The method then ends at block 614.

Thus, the method 600 operates to allow a device to receive a regional parameter set in one embodiment of a delivery system. It should be noted that the method 600 represents just one implementation and that other implementations are possible within the scope of the embodiments.

Figure 7:
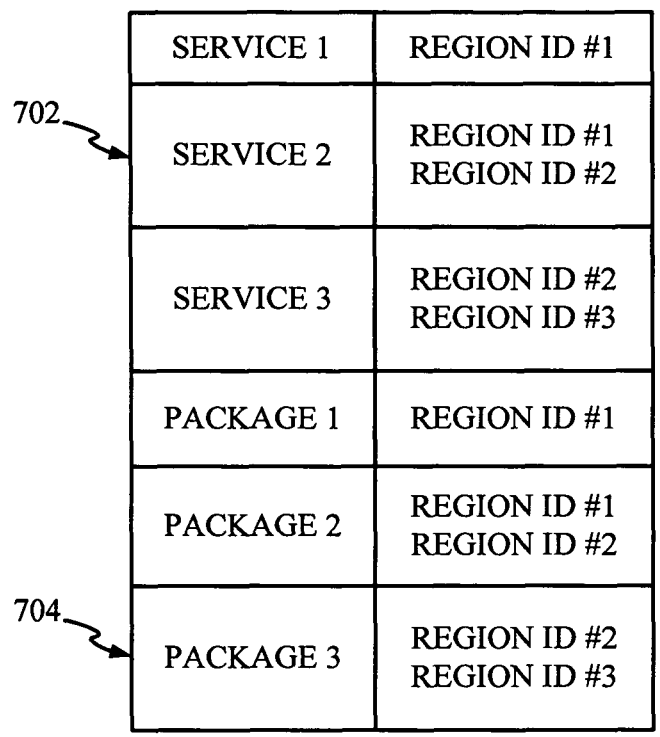
FIG. 7 shows one embodiment of a message structure for use in embodiments of a system for delivering regional parameters.

FIG. 7 shows one embodiment of a parameter message structure 700 for use in embodiments of a delivery system. For example, the message structure 700 may be generated by the stream generator logic 210 shown in FIG. 2.

The parameter message structure 700 operates to associate available services and packages with region identifiers. For example, service #2 is associated with regions identifiers #1 and #2 as shown at 702. Furthermore, package #3 is associated with region identifiers #2 and #3 as shown at 704.

Therefore, the parameter message structure 700 operates to allow a distribution system to transmit system information that identifies packages and services that are available in various regions of a wide area network. It should also be noted that embodiments of the delivery system are not limited to using only the message structure 700, but may utilize other suitable message structures to associate available content, packages, services with selected regions.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while one or more embodiments of a delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for delivering regional parameters, the method comprising:
   receiving a parameter stream that comprises one or more sets of regional parameters associated with one or more regions;
   determining a first real-time region indicator;
   selecting one or more selected sets of regional parameters from the parameter stream based on the first real-time region indicator; and
   rendering information based on the one or more selected sets of regional parameters, using a mobile device, to enable a device user to subscribe to at least one of content and a service that is currently available within a current operating region of the mobile device, as indicated by the rendered information,
   wherein the service comprises at least one sequence of presentations.

2. The method of claim 1, further comprising receiving the parameter stream in a wireless transmission.

3. The method of claim 1, wherein said determining comprises determining the first real-time region indicator from information received in a wireless transmission.

4. The method of claim 1, wherein said determining comprises:
   determining a real-time position indicator; and
   determining the first real-time region indicator based on the real-time position indicator.

5. The method of claim 1, further comprising:
   determining a second real-time region indicator; and
   selecting the one or more selected sets of regional parameters from the parameter stream based on the second real-time region indicator.

6. The method of claim 1, wherein the parameter stream is a first parameter stream, and the method further comprises:
   determining a second real-time region indicator;
   receiving a second parameter stream; and
   selecting the one or more selected sets of regional parameters from the second parameter stream based on the second real-time region indicator.

7. The method of claim 1, wherein the parameter stream is a first parameter stream, and the method further comprises:
   receiving a second parameter stream; and
   selecting the one or more selected sets of regional parameters from one or both of the first and second parameter streams based on the first real-time region indicator.

8. Apparatus for delivering regional parameters, the apparatus comprising:
   transceiver logic configured to receive a parameter stream that comprises one or more sets of regional parameters associated with one or more regions;
   positioning logic configured to determine a first real-time region indicator;
   processing logic configured to select one or more selected sets of regional parameters from the parameter stream based on the first real-time region indicator; and
   rendering logic configured to render information based on the one or more selected sets of regional parameters; and
   a display configured to enable an apparatus user to subscribe to at least one of content and a service that is currently available within a current operating region of the apparatus, as indicated by the rendered information,
   wherein the service comprises at least one sequence of presentations.

9. The apparatus of claim 8, wherein said transceiver logic is configured to receive the parameter stream in a wireless transmission.

10. The apparatus of claim 8, wherein the apparatus comprises a mobile device.

11. The apparatus of claim 8, wherein said positioning logic is configured to determine the first real-time region indicator from information received in a wireless transmission.

12. The apparatus of claim 8, wherein said positioning logic comprises:
logic configured to determine a real-time position indicator; and
logic configured to determine the first real-time region indicator based on the real-time position indicator.

13. The apparatus of claim 8, further comprising:
logic configured to determine a second real-time region indicator; and
logic configured to select the one or more selected sets of regional parameters from the parameter stream based on the second real-time region indicator.

14. The apparatus of claim 8, wherein the parameter stream is a first parameter stream, and the apparatus further comprises:
logic configured to determine a second real-time region indicator;
logic configured to receive a second parameter stream; and
logic configured to select the one or more selected sets of regional parameters from the second parameter stream based on the second real-time region indicator.

15. The apparatus of claim 8, wherein the parameter stream is a first parameter stream, and the apparatus further comprises:
logic configured to receive a second parameter stream; and
logic configured to select the one or more selected sets of regional parameters from one or both of the first and second parameter streams based on the first real-time region indicator.

16. Apparatus for delivering regional parameters, the apparatus comprising:
means for receiving a parameter stream that comprises one or more sets of regional parameters associated with one or more regions;
means for determining a first real-time region indicator;
means for selecting one or more selected sets of regional parameters from the parameter stream based on the first real-time region indicator;
means for rendering information based on the one or more selected sets of regional parameters; and
means for enabling an apparatus user to subscribe to at least one of content and a service that is currently available in a current operating region of the apparatus, as indicated by the rendered information,
wherein the service comprises at least one sequence of presentations.

17. The apparatus of claim 16, further comprising means for receiving the parameter stream in a wireless transmission.

18. The apparatus of claim 16, wherein the apparatus comprises a mobile device.

19. The apparatus of claim 16, wherein said means for determining comprises means for determining the first real-time region indicator from information received in a wireless transmission.

20. The apparatus of claim 16, wherein said means for determining comprising:
means for determining a real-time position indicator; and
means for determining the first real-time region indicator based on the real-time position indicator.

21. The apparatus of claim 16, further comprising:
means for determining a second real-time region indicator; and
means for selecting the one or more selected sets of regional parameters from the parameter stream based on the second real-time region indicator.

22. The apparatus of claim 16, wherein the parameter stream is a first parameter stream and the apparatus further comprises:
means for determining a second real-time region indicator;
means for receiving a second parameter stream; and
means for selecting the one or more selected sets of regional parameters from the second parameter stream based on the second real-time region indicator.

23. The apparatus of claim 16, wherein the parameter stream is a first parameter stream and the apparatus further comprises:
means for receiving a second parameter stream; and
means for selecting the one or more selected sets of regional parameters from one or both of the first and second parameter streams based on the first real-time region indicator.

24. A computer-readable medium comprises instructions, which when executed by at least one processor, operates to deliver regional parameters, the computer-readable medium comprising:
instructions for receiving a parameter stream that comprises one or more sets of regional parameters associated with one or more regions;
instructions for determining a first real-time region indicator;
instructions for selecting one or more selected sets of regional parameters from the parameter stream based on the first real-time region indicator; and
rendering information based on the one or more selected sets of regional parameters, using a mobile device, to enable a device user to subscribe to at least one of content and a service that is currently available within a current operating region of the mobile device, as indicated by the rendered information,
wherein the service comprises at least one sequence of presentations.

25. The computer-readable medium of claim 24, further comprising instructions for receiving the parameter stream in a wireless transmission.

26. The computer-readable medium of claim 24, wherein said instructions for determining comprise instructions for determining the first real-time region indicator from information received in a wireless transmission.

27. The computer-readable medium of claim 24, wherein said instructions for determining comprise:
instructions for determining a real-time position indicator; and
instructions for determining the first real-time region indicator based on the real-time position indicator.

28. The computer-readable medium of claim 24, further comprising:
instructions for determining a second real-time region indicator; and
instructions for selecting the one or more selected sets of regional parameters from the parameter stream based on the second real-time region indicator.

29. The computer-readable medium of claim 24, wherein the parameter stream is a first parameter stream and the computer-readable medium further comprises:
instructions for determining a second real-time region indicator;
instructions for receiving a second parameter stream; and instructions for selecting the one or more selected sets of regional parameters from the second parameter stream based on the second real-time region indicator.

30. The computer-readable medium of claim 24, wherein the parameter stream is a first parameter stream and the computer-readable medium further comprises:
instructions for receiving a second parameter stream; and
instructions for selecting the one or more selected sets of regional parameters from one or both of the first and second parameter streams based on the first real-time region indicator.

31. At least one processor configured to perform a method for delivering regional parameters, the method comprising:
receiving a parameter stream that comprises one or more sets of regional parameters associated with one or more regions;
determining a first real-time region indicator;
selecting one or more selected sets of regional parameters from the parameter stream based on the first real-time region indicator; and
rendering information based on the one or more selected sets of regional parameters, using a mobile device, to enable a device user to subscribe to at least one of content and a service that is currently available within a current operating region of the mobile device, as indicated by the rendered information,
wherein the service comprises at least one sequence of presentations.

32. The method of claim 31, further comprising receiving the parameter stream in a wireless transmission.

33. The method of claim 31, wherein said determining comprising determining the first real-time region indicator from information received in a wireless transmission.

34. The method of claim 31, wherein said determining comprises:
determining a real-time position indicator; and
determining the first real-time region indicator based on the real-time position indicator.

35. The method of claim 31, further comprising:
determining a second real-time region indicator; and
selecting the one or more selected sets of regional parameters from the parameter stream based on the second real-time region indicator.

36. The method of claim 31, wherein the parameter stream is a first parameter stream and the method further comprises:
determining a second real-time region indicator;
receiving a second parameter stream; and
selecting the one or more selected sets of regional parameters from the second parameter stream based on the second real-time region indicator.

37. The method of claim 31, wherein the parameter stream is a first parameter stream and the method further comprises:
receiving a second parameter stream; and
selecting the one or more selected sets of regional parameters from one or both of the first and second parameter streams based on the first real-time region indicator.

38. A method for delivering regional parameters, the method comprising:
determining one or more sets of regional parameters associated with one or more regions;
adding one or more region identifiers to each of the one or more sets of regional parameters, wherein the one or more region identifiers indicate selected regions to which each of the one or more sets of regional parameters apply; and
generating a first parameter stream that comprises a first portion of the one or more sets of regional parameters using a computer, the first portion of the one or more sets of regional parameters to enable a user or a mobile device to subscribe to at least one of content and a service that is currently available within a current operating region of the mobile device, as indicated by the first portion of the one or more sets of regional parameters,
wherein the service comprises at least one sequence of presentations.

39. The method of claim 38, further comprising transmitting the first parameter stream in a wireless transmission.

40. The method of claim 38, further comprising transmitting the first parameter stream over a wide area to a plurality of mobile devices.

41. The method of claim 38, further comprising generating a second parameter stream that comprises a second portion of the one or more sets of regional parameters.

42. Apparatus for delivering regional parameters, the apparatus comprising:
processing logic configured to determine one or more sets of regional parameters associated with one or more regions; and
stream generation logic configured to add one or more region identifiers to each of the one or more sets of regional parameters, wherein the one or more region identifiers indicate selected regions to which each of the one or more sets of regional parameters apply, and to generate a first parameter stream that comprises a first portion of the one or more sets of regional parameters, the first portion of the one or more sets of regional parameters to enable a user of a mobile device to subscribe to at least one of content and a service that is currently available within a current operating region of the mobile device, as indicated by the first portion of the one or more sets of regional parameters,
wherein the service comprises at least one sequence of presentations.

43. The apparatus of claim 42, further comprising transmitting logic configured to transmit the first parameter stream in a wireless transmission.

44. The apparatus of claim 42, further comprising transmitting logic configured to transmit the first parameter stream over a wide area to a plurality of mobile devices.

45. The apparatus of claim 42, wherein the stream generation logic is configured to generate a second parameter stream that comprises a second portion of the one or more sets of regional parameters.

46. At least one processor configured to perform a method for delivering regional parameters, the method comprising:
determining one or more sets of regional parameters associated with one or more regions;
adding one or more region identifiers to each of the one or more sets of regional parameters, wherein the one or more region identifiers indicate selected regions to which each of the one or more sets of regional parameters apply; and
generating a first parameter stream that comprises a first portion of the one or more sets of regional parameters, the first portion of the one or more sets of regional parameters to enable a user of a mobile device to subscribe to at least one of content and a service that is currently available within a current operating region of the mobile device, as indicated by the first portion of the one or more sets of regional parameters,
wherein the service comprises at least one sequence of presentations.

47. The method of claim 46, further comprising transmitting the first parameter stream in a wireless transmission.

48. The method of claim 46, further comprising transmitting the first parameter stream over a wide area to a plurality of mobile devices.

49. The method of claim 46, further comprising generating a second parameter stream that comprises a second portion of the one or more sets of regional parameters.

50. Apparatus for delivering regional parameters, the apparatus comprising:
   means for determining one or more sets of regional parameters associated with one or more regions;
   means for adding one or more region identifiers to each of the one or more sets of regional parameters, wherein the one or more region identifiers indicate selected regions to which each of the one or more sets of regional parameters apply; and
   means for generating a first parameter stream that comprises a first portion of the one or more sets of regional parameters, the first portion of the one or more sets of regional parameters to enable a user of a mobile device to subscribe to at least one of content and a service that is currently available within a current operating region of the mobile device, as indicated by the first portion of the one or more sets of regional parameters,
   wherein the service comprises at least one sequence of presentations.

51. The apparatus of claim 50, further comprising means for transmitting the first parameter stream in a wireless transmission.

52. The apparatus of claim 50, further comprising means for transmitting the first parameter stream over a wide area to a plurality of mobile devices.

53. The apparatus of claim 50, further comprising means for generating a second parameter stream that comprises a second portion of the one or more sets of regional parameters.

54. A delivery system for sending a parameter message, for providing system information, the parameter message comprising:
   a first set of parameters identifying one or more packages and services; and
   a second set of parameters associated with the first set of parameters, wherein the second set of parameters identify regions in which selected packages and services are available, the first and second parameters to enable a user of a mobile device to subscribe to at least one of content and a service that is currently available within a current operating region of the mobile device, as indicated by the first and second parameters,
   wherein the service comprises at least one sequence of presentations.

55. A parameter message for providing system information to a device in a delivery system, the parameter message comprising:
   a first set of parameters identifying one or more packages and services; and
   a second set of parameters associated with the first set of parameters, wherein the second set of parameters identify regions in which selected packages and services are available, the first and second parameters to enable a user of a mobile device to subscribe to at least one of content and a service that is currently available within a current operating region of the mobile device, as indicated by the first and second parameters,
   wherein the service comprises at least one sequence of presentations.

56. The delivery system of claim 54, wherein the parameter message is sent in a wireless transmission.

57. The delivery system of claim 54, wherein the parameter message is sent over a wide area to a plurality of mobile devices.

* * * * *